United States Patent
Yada et al.

(10) Patent No.: US 9,522,484 B2
(45) Date of Patent: Dec. 20, 2016

(54) POWDER COMPOUND AGENT COLLECTION DEVICE FOR SEAL PRESSURIZED-TYPE KNEADING MACHINE, AND COLLECTION METHOD THEREFOR

(75) Inventors: Yasuo Yada, Mie (JP); Tatsuo Yada, Mie (JP)

(73) Assignee: Suzuka Engineering Co., Ltd., Mie (JP)

( * ) Notice: Subject to any disclaimer, the term of this patent is extended or adjusted under 35 U.S.C. 154(b) by 334 days.

(21) Appl. No.: 14/357,535

(22) PCT Filed: Jul. 30, 2012

(86) PCT No.: PCT/JP2012/069335
§ 371 (c)(1),
(2), (4) Date: May 9, 2014

(87) PCT Pub. No.: WO2013/073237
PCT Pub. Date: May 23, 2013

(65) Prior Publication Data
US 2014/0291876 A1     Oct. 2, 2014

(30) Foreign Application Priority Data
Nov. 17, 2011  (JP) ................. 2011-251863

(51) Int. Cl.
*B29B 7/10* (2006.01)
*B29B 17/00* (2006.01)
(Continued)

(52) U.S. Cl.
CPC .......... *B29B 17/0005* (2013.01); *B08B 17/00* (2013.01); *B29B 7/183* (2013.01); *B29B 7/246* (2013.01); *B29B 7/84* (2013.01)

(58) Field of Classification Search
CPC .................... B29B 7/10–7/20; B29B 17/0005
See application file for complete search history.

(56) References Cited

U.S. PATENT DOCUMENTS

2012/0087202 A1     4/2012  Yada et al.

FOREIGN PATENT DOCUMENTS

| DE | 2051142 A1 | 4/1972 |
|---|---|---|
| JP | 79436 A | 1/1995 |

(Continued)

OTHER PUBLICATIONS

JP 2005-185948 A (Okuda) Jul. 14, 2005 (English language machine translation). [online] [retrieved Aug. 20, 2016]. Retrieved from: Japan Patent Office Advanced Industrial Property Network.*

(Continued)

*Primary Examiner* — Erin Snelting
(74) *Attorney, Agent, or Firm* — Fitch, Even, Tabin & Flannery, LLP

(57) ABSTRACT

To improve the work environment by preventing a larger amount of a powder compounding agent from being discarded as power dust and by returning the powder compounding agent into a kneading tank by capturing said powder compounding agent by employing a simple means in closed pressure type kneader. Also to bring the compound quality closer to the design quality by drastically increasing the valuable collection rate. A recovery device for collecting an ejected powder compounding agent is installed on a closed pressure type kneader for kneading a kneading material along with a powder compounding agent in a kneading tank by rotating a kneading rotor. In the recovery device, a tubular air bag capable of expanding and contracting is connected to the side surface of the surrounding wall of the kneading tank with a ventilation chute between the air bag and the surrounding wall, the surrounding wall surrounding (Continued)

the periphery of a pressurized lid rising/lowering path. A branching duct capable of connecting to and being disconnected from the outside is connected to the top of the air bag, and a filter tube for filtering and capturing the powder compounding agent carried by a gaseous body flowing from the side of the kneading tank is disposed in a suspended manner within the air bag. As a consequence, it is possible to return the powder compounding agent captured by means of the filter tube to the kneading tank by means of the pressurized air flow accumulated in the air bag.

4 Claims, 6 Drawing Sheets

(51) Int. Cl.
*B29B 7/18* (2006.01)
*B29B 7/24* (2006.01)
*B08B 17/00* (2006.01)
*B29B 7/84* (2006.01)

(56) References Cited

FOREIGN PATENT DOCUMENTS

| | | | |
|---|---|---|---|
| JP | 7124941 | A | 5/1995 |
| JP | 200466039 | A | 3/2004 |
| JP | 2005185948 | A | 7/2005 |
| WO | 2010147014 | A1 | 12/2010 |

OTHER PUBLICATIONS

Supplementary European Search Report for International Application No. EP 12 84 9078 dated Oct. 29, 2014.
International Search Report for International Application No. PCT/JP2012/069335 dated Sep. 25, 2012.
Office Action for Chinese Application No. CN 201280056343.9 dated May 20, 2015.

* cited by examiner

POWDER COMPOUND AGENT COLLECTION DEVICE FOR SEAL PRESSURIZED-TYPE KNEADING MACHINE, AND COLLECTION METHOD THEREFOR

CROSS-REFERENCE TO RELATED APPLICATION

This application is a U.S. national phase application of International Application No. PCT/JP2012/069335, filed Jul. 30, 2012, designating the United States, which is hereby incorporated herein by reference in its entirety.

TECHNICAL FIELD

The present invention relates to a recovery device that recovers a powder compounding agent ejected from a closed pressure type kneader for kneading a high viscosity kneading material such as rubber, plastic and ceramics in a batch manner, and a method for recovering the powder compounding agent using the recovery device.

BACKGROUND ART

Closed type kneaders which include a pair of kneading rotors supported in a kneading tank so that a kneading material is kneaded under pressure by rotation of the pair of kneading rotors have been generally known, not to mention an example. The known batch type kneaders for kneading a high viscosity kneading material such as rubber, plastic and ceramics in a batch manner include open type kneaders and closed pressure type kneaders. In the closed pressure type kneaders have a problem in that, when a batch of powder compounding agent is loaded into a kneading tank, a gas of a volume which corresponds to that of the powder compounding agent flowing into the kneading tank is ejected while entraining the powder compounding agent, and the gas in the pressurizing cap raising and lowering path is compressed and increased in pressure when the pressurizing cap is lowered, and a dust-containing gas which entrains the powder compounding agent having a volume replaced from the inside of the kneading tank to the upper area of the pressurizing cap as the pressurizing cap is lowered is ejected through a narrow gap between the pressurizing cap and four circumferential inner walls of the raising and lowering path to the outside of the device, and accordingly, dust must be collected by providing a suction hood having a high suction capacity to prevent dust from being scattered to the outside.

The kneader disclosed in Patent Document 1 includes an internal pressure increase prevention device 10 to which a pressure adjusting air bag 28 which is inflatable and deflatable via a chute 34 is connected at a position on a side wall above a kneading tank 16, and is configured to allow a gas in the tank to flow into the air bag when an internal pressure of the kneading tank increases, and to allow the gas in the air bag to be returned into the kneading tank when the internal pressure of the kneading tank decreases. The internal pressure increase prevention device 10 is effective to prevent increase in the internal pressure of the kneading tank when the pressurizing cap pushes the kneading material into the kneading tank and applies pressure to a volume of a gas which corresponds to the amount that the pressurizing cap is lowered, and prevent increase in pressure that causes the powder compounding agent loaded in the kneading tank to be leaked from a shaft seal structure of the kneader or a seal section of a door of a loading section or a output section of the kneading material. In addition to that, the internal pressure increase prevention device 10 also prevents degradation of surrounding environment caused by the powder compounding agent loaded in the kneading tank of the closed pressure type kneader being ejected through a gap around the opening of the kneading tank to the outside.

More specifically, in the kneader disclosed in Patent Document 1, when the gas increased in pressure in the kneading tank as the pressurizing cap is lowered into the kneading tank is ejected through a gap around the pressurizing cap at the opening of the kneading tank, a dust flow which entrains the powder compounding agent is ejected to an area above the pressurizing cap. Since the kneader is equipped with the internal pressure increase prevention device 10 which includes the air bag 28, a mixed phase gas containing the powder compounding agent is stored with the accumulated pressure in the air bag, and then is returned into the kneading tank when an instantaneous pressure drop occurs in the kneading tank due to a raising operation of the pressurizing cap, and accordingly, the powder compounding agent ejected to an area above the pressurizing cap as a dust flow is returned into the kneading material during kneading process.

The kneader can decrease contamination due to dust scattering around the kneader compared to a kneader which does not include the internal pressure increase prevention device, effectively improve a working environment which has been worsened by ejected powder compounding agent such as carbon black and white filler, and also improve the compound quality by recovering the powder compounding agent and returning it to the kneading material. However, the valuable recovery rate of the powder compounding agent remains around 50%, which is not always satisfactory for the following reasons.

That is, in the internal pressure increase prevention device 10 according to Patent Document 1, the air bag body 30 needs a capacity of at least the amount of air which is moved by upward and downward motion of the ram cylinder 24. However, with this capacity, the volume of the gas which flows into the air bag body 30 may exceed the air bag capacity when the material larger than the planned volume is loaded into the kneading tank or when the temperature of the gas in the kneading tank increases. Accordingly, a branch duct 50 which forms a safety flow path for preventing damage is connected to the air bag body 30 so that part of the gas can be exhausted through the branch duct 50 to the external dust collector when the gas which flows into the air bag exceeds the capacity of the air bag.

In the aforementioned configuration of the internal pressure increase prevention device 10, the air bag 28 which is connected to the kneading tank through the chute 34 has a relatively large diameter since it needs a capacity that allows a large amount of gas to be flowed therein. As a result, the gas which flows into the air bag 28 via the chute 34 suddenly decreases in flow speed, and the powder of large particle diameter in the mixed phase flow in the powder compounding agent is precipitated and deposited at an early stage, and the powder of middle particle diameter is suspended and accumulated in the air bag 28 as a mixed gaseous phase, and the powder of fine particles is suctioned through the branch duct 50 to the external dust collector. This may lead to constraints of the recovery rate and the recovery amount depending on the particle diameter and the weight of the powder compounding agent, that is, when the pressurizing cap is lowered at high speed or a large amount of the powder compounding agent is loaded into the kneading tank, a replacement gas which is urged to flow out of the kneading tank is suctioned via the branch duct 50 to the dust collector while entraining high density of fine particles of the powder compounding agent.

Accordingly, regardless of presence of the air bag 28, the gas exhausted through the branch duct 50 to the dust collector contains a large amount of powder compounding agent as dust. Particularly, fine dust cannot be recovered from the exhaust gas exhausted from the branch duct. As a result, although improvement in working environment may be expected, various powder compounding agent ejected into the air bag 28 cannot be efficiently recovered to return to the kneading material. Since almost half of the powder compounding agent which is ejected from the kneading tank is disposed of as dust, there is a need to further improve the valuable recovery rate so as to increase the valuable recovery rate to bring the compound quality close to the design quality.

CITATION LIS

Patent Document

Patent Document 1: Japanese Unexamined Patent Application Publication No. 2005-185948

SUMMARY OF INVENTION

Technical Problem

An object of the present invention is to provide a powder compounding agent recovery unit which improves the powder compounding agent recovery performance in the closed pressure type kneader according to Patent Document 1 which includes an air bag that serves as the aforementioned internal pressure increase prevention device. More specifically, even if the gas which flows into the air bag exceeds the capacity of the air bag, the powder compounding agent recovery unit can prevent a large amount of powder compounding agent from being contained as dust when part of the gas is exhausted to the outside through the branch duct which is connected to the air bag, and capture the powder compounding agent by a simple technique and return it into the kneading tank, and accordingly, bring the compound quality close to the design quality with a low cost so that the valuable recovery rate can be largely increased and contamination due to dust scattering around the kneader can be significantly reduced.

Solution to Problem

An aspect of the present invention provides a powder compounding agent recovery device for a closed pressure type kneader that is installed on the closed pressure type kneader and recovers a powder compounding agent ejected from a kneading tank, the closed pressure type kneader including a pair of kneading rotors that rotate in the kneading tank which is provided with a pressurizing cap raising and lowering path on the upper side thereof to be closable by a pressurizing cap which is movable to open and close it by means of a pressurizing mechanism so that a kneading material loaded into the kneading tank is kneaded together with a powder compounding agent by rotation of the kneading rotors with a pressure applied by the pressurizing cap, wherein an air bag which is formed in a tubular shape and is inflatable and deflatable is connected at a lower end via a ventilation chute to one side face of a surrounding wall which surrounds the pressurizing cap raising and lowering path of the kneading tank which is opened and closed by the pressurizing cap with an upper end of the air bag being sealed while being held in the tubular shape and hung so as to be movable upward and downward in response to inflation and deflation of the air bag, an upper portion of the air bag is connected to a branch duct which serves as a safety flow path for avoiding an excessive pressurization and is operable to be opened and closed to an outside, and a filtering tube that filters and captures a powder compounding agent entrained in a gas which flows from the kneading tank into the air bag is suspended inside the air bag and is configured to be capable of returning the powder compounding agent captured by the filtering tube to the kneading tank by using a pressurization gas accumulated in the air bag.

According to a preferable embodiment of the powder compounding agent recovery device for a closed pressure type kneader according to the present invention, the filtering tube suspended inside the air bag is sealed at an upper end formed in a small diameter by gathering the upper end of the tubular shaped filter cloth into pleats, and a lower end of the filtering tube formed in a tubular shape is connected along with the lower end of the air bag to a large diameter portion of an upper end of the ventilation chute. More specifically, an envelope surface which is in contact with an inner bottom of troughs of the pleats which are formed by gathering the upper end of the tubular shaped filter cloth of the filtering tube forms a conical shape, and the filtering tube has a conical shape with a gap being held between the entire peripheral surface of the filtering tube and an inner surface of the air bag when the air bag is held in a tubular shape by an internal pressure.

Further, according to a preferable embodiment of the powder compounding agent recovery device for a closed pressure type kneader according to the present invention, in the closed pressure type kneader which is provided with an openable loading door for loading the kneading material into the kneading tank and a compounding agent hopper for loading the powder compounding agent via a powder chute which includes a loading valve on side faces of the surrounding wall of the pressurizing cap raising and lowering path of the kneading tank, an open/close damper is provided in each of the ventilation chute that connects the kneading tank to the air bag and the branch duct and the open/close damper can be opened and closed by manual or by automatic control of a controller.

Further, according to another preferable embodiment of the powder compounding agent recovery device for a closed pressure type kneader according to the present invention, a nozzle that allows a gas for blow off to be sent into an area in the air bag and outside the filtering tube is disposed as a blow off mechanism of the powder compounding agent that assists a pressurization gas in the air bag to blow off the powder compounding agent captured by the filtering tube and return it to the kneading tank, and the nozzle is connected to a gas source via a ventilation control valve that controls the amount of ventilation.

Another aspect of the present invention provides a powder compounding agent recovery method for a closed pressure type kneader for recovering the powder compounding agent which is ejected from a kneading tank in the closed pressure type kneader in which a kneading material loaded into the kneading tank along with the powder compounding agent loaded from a compounding agent hopper via a powder chute is kneaded in the kneading tank by rotation of a pair of kneading rotors with a pressure applied by a pressurizing cap, including: providing a powder compounding agent recovery device for recovering the powder compounding agent in which an inflatable and deflatable air bag is connected via a ventilation chute that communicates with a pressurizing cap raising and lowering path of the kneading tank while the air bag is connected to a branch duct which is operable to be opened and closed to an outside, and an open/close damper is provided in each of the ventilation chute and the branch duct; in kneading of the kneading material and the powder compounding agent in the kneading tank, in the state that the open/close damper of the branch duct is open and the open/close damper of the ventilation chute is closed, loading the powder compounding agent onto the kneading material in the kneading tank while a loading valve disposed in the powder chute and the open/close damper disposed in the ventilation chute are simultaneously opened, and in so doing, allowing a filtering tube disposed inside the air bag to filter and capture the powder compounding agent entrained by a gas which flows from the kneading tank to the air bag while applying a pressure by the gas to the inside of the air bag; allowing the gas ejected from the kneading tank and the powder compounding agent entrained by the gas as the pressurizing cap is lowered to knead the kneading material and the powder compounding agent to flow into the air bag and apply a pressure to the inside of the air bag while allowing the filtering tube to capture the powder compounding agent entrained by the gas, and performing a kneading operation by the kneading rotor; at the end of the kneading operation, allowing the gas which has been filled in the air bag in a pressurized state to flow into the kneading tank whose internal pressure instantaneously becomes negative when the pressurizing cap is raised so that a flow of the gas blows off the powder compounding agent which has been filtered and captured by the filtering tube into the kneading tank; and lowering the pressurizing cap and performing a finishing kneading operation by kneading the powder compounding agent returned to the kneading tank and completing a series of the kneading operations.

According to a preferable embodiment of the powder compounding agent recovery method, the filtering tube having the aforementioned configuration is used as the filtering tube suspended inside the air bag, and the filtering tube has a conical shape with a gap being held between the entire peripheral surface of the filtering tube and an inner surface of the air bag when the air bag is held in a tubular shape by an internal pressure.

According to another preferable embodiment of the powder compounding agent recovery method, when the gas which has been filled in the air bag in a pressurized state flows into the kneading tank due to decrease in the internal pressure of the kneading tank as the pressurizing cap is raised after the kneading operation, an additional blow off mechanism for blowing off the powder compounding agent which has been captured by the filtering tube is actuated to blow off the powder compounding agent of the filtering tube.

The above described closed type kneader is equipped with the powder compounding agent recovery device having a similar configuration to that of the internal pressure increase prevention device of the closed type kneader disclosed in Patent Document 1, and when performing the powder compounding agent recovery method, as described in Patent Document 1, a pressure releasing gap which is provided around the periphery of the openable material loading door in the known kneader is hermetically sealed.

With this configuration, the gas is allowed to flow out from the kneader only through a flow path that extends through the ventilation chute to the air bag, and the air bag disposed in the flow path can prevent the internal pressure of the kneader from being increased in response to the raising and lowering operation of the pressurizing cap and change in pressure or flow in the kneader during loading of the material, and also can prevent dust scattering in various sections of the kneader.

Further, in the present invention, the filtering tube is incorporated inside the air bag as a double structure, which provides a dust collector having an expandable and collapsible outer enclosure. Accordingly, unlike the conventional kneader, there is no need to provide a large dust collection hood for suctioning the dust on the material loading door when the door is open and no need to perform suction operation for collecting dust. Since all the powder compounding agent scattered from the kneader is captured by the filtering tube inside the air bag, the material recovery rate can be significantly improved. Moreover, the powder compounding agent recovery device is formed by the flexible, deformable, expandable and collapsible outer enclosure as a ventilation and backwash type device composed of the air bag which is suspended in the air and does not use electric energy, the filtering tube disposed inside the air bag, and a blow off mechanism for blowing off the powder compounding agent captured by the filtering tube and the like, and can be provided as a device with a high capability and also significantly simplified and economically efficient compared with the conventional dust collector mounted around the kneader.

Advantageous Effects of Invention

According to the aforementioned powder compounding agent recovery device for a closed pressure type kneader and the powder compounding agent recovery method of the present invention, it is possible to improve the powder compounding agent recovery performance in the known closed pressure type kneader which includes an air bag that serves as the internal pressure increase prevention device. More specifically, even if the gas which flows into the air bag exceeds the capacity of the air bag, it is possible to filter and capture the powder compounding agent by the filtering tube inside the air bag while preventing a high density of powder compounding agent from being entrained in the gas ejected from the kneading tank when part of the gas is exhausted to the outside through the branch duct which is connected to the air bag, and blow off the powder compounding agent from the filtering tube by using a simple technique such as deflation of the air bag which forms a flexible outer enclosure and an additional blow off mechanism of the powder compounding agent when the powder compounding agent is returned to the kneading tank, and accordingly, bring the compound quality close to the design quality with a low cost so that the valuable recovery rate can be largely increased and contamination due to dust scattering around the kneader can be significantly reduced.

DESCRIPTION OF EMBODIMENTS

Figure 1:
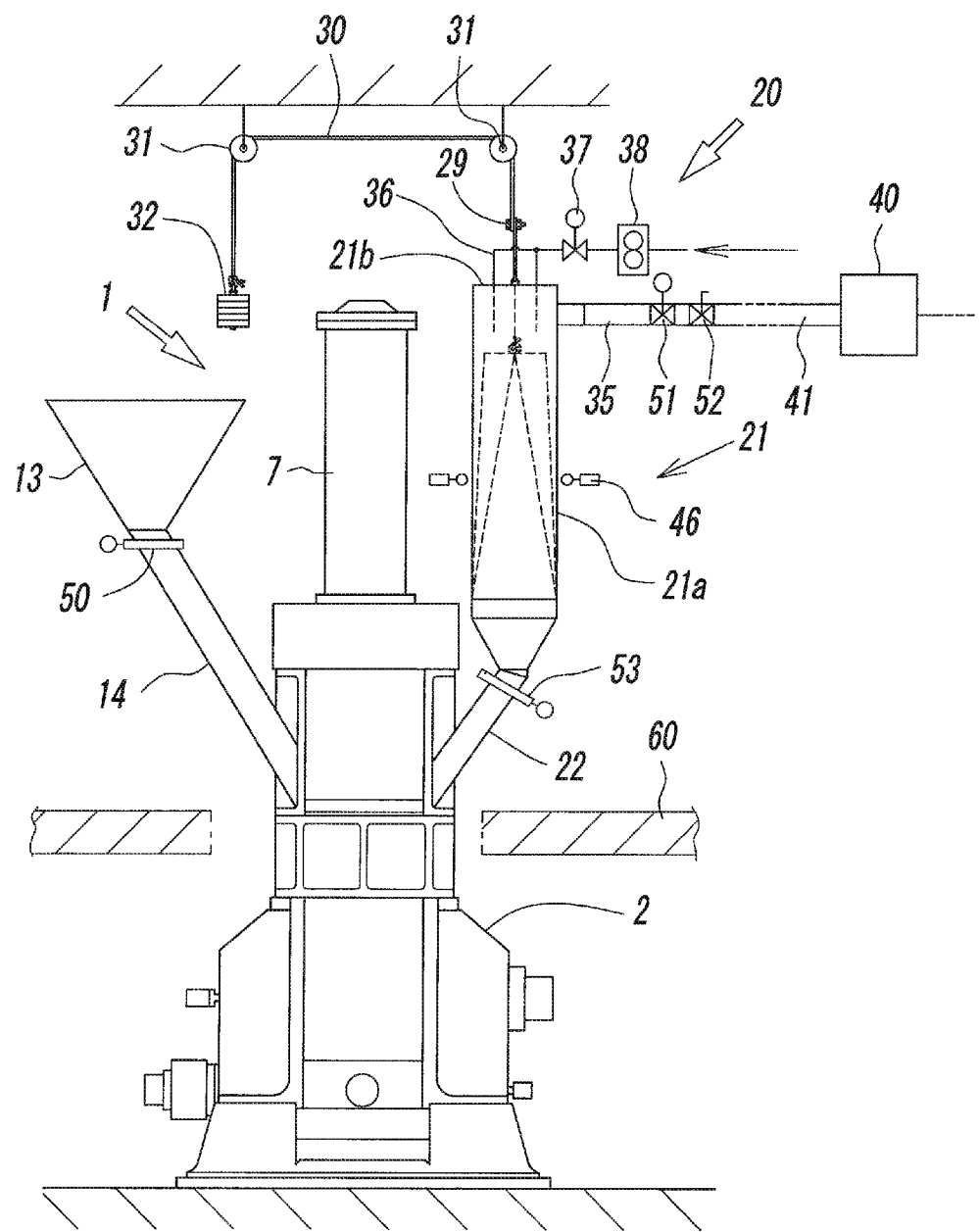
FIG. 1 is a front view of an embodiment of a closed pressure type kneader which includes a powder compounding agent recovery device according to the present invention.
Figure 2:
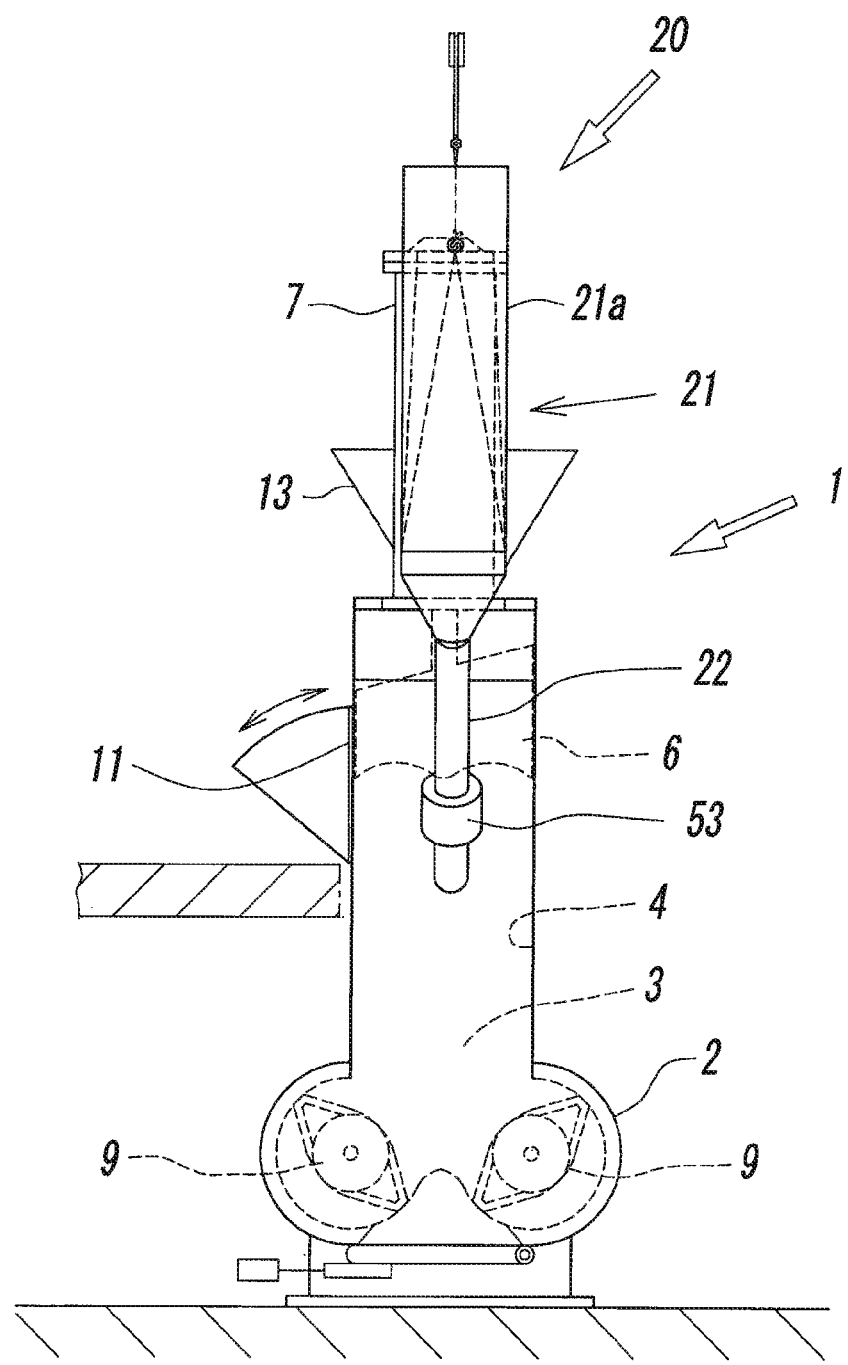
FIG. 2 is a side view of FIG. 1.

FIGS. 1 through 4 show an exemplary embodiment of a closed pressure type kneader 1 which includes a powder compounding agent recovery device 20 according to the present invention, and FIGS. 5 through 8 schematically show an operation state of the powder compounding agent recovery device 20.

An illustrated closed pressure type kneader 1 for kneading a high viscosity kneading material such as rubber, plastic and ceramics in a batch manner includes a kneading tank 2 with a pressurizing cap raising and lowering path 3 on the upper side of the kneading tank 2 being closable by a pressurizing cap 6 which is movable to open and close by a pressurizing mechanism 7 which is formed by a hydraulic cylinder. The kneading material is kneaded in the kneading tank 2 by rotating two adjacent kneading rotors 9. An openable loading door 11 is provided on the front side of a surrounding wall 4 of the pressurizing cap raising and lowering path 3 of the kneading tank 2 which is opened and closed by the pressurizing cap 6 so that the high viscosity kneading material is loaded through the loading door 11 into the kneading tank 2. A compounding agent hopper 13 is provided on one side of the surrounding wall 4 of the pressurizing cap raising and lowering path 3 of the kneading tank 2 so that a kneading powder compounding agent P is supplied through the compounding agent hopper 13 to the kneading tank 2 via a powder chute 14.

As known in the art, the pressurizing cap 6 serves to hold the inside of the kneading tank 2 in a pressurized state. In addition to that, when the internal pressure rises by a certain amount due to increased temperature or the like, the pressurizing cap 6 is lifted so that the internal pressure is released through its peripheral area into the above space. Further, when the above powder compounding agent recovery device is installed, a pressure releasing gap such as that disposed on the peripheral edge of an open/close type material loading door of a known pressure type kneader is sealed and an upper portion of the pressurizing cap raising and lowering path 3 is also closed. Accordingly, a gas is allowed to flow out from the kneader through a ventilation path such as a path through the opened loading door 11, through the powder chute 14, or through a ventilation chute 22, which is described later, to an air bag 21.

As similar to that described in Patent Document 1, the kneading tank 2 also includes the air bag 21 in a tubular shape which forms a main part of the powder compounding agent recovery device 20. The air bag 21 is connected to the other side face of the surrounding wall 4 of the pressurizing cap raising and lowering path 3 of the kneading tank 2 via the ventilation chute 22. The powder compounding agent recovery device 20 is made by partially modifying a configuration of an internal pressure rising prevention device according to Patent Document 1. In addition to that, the powder compounding agent recovery device 20 is advantageous in that a working environment is significantly improved as described below in detail, and the powder compounding agent ejected from the kneading tank 2 is highly effectively recovered and returned to the kneading material, thereby improving composition quality in products and reducing a large amount of waste which is suctioned and collected as dust in a dust collector provided outside the kneader.

The air bag 21 is formed of an impermeable material having a deformable flexibility and a certain degree of elasticity. When the internal pressure of the kneading tank 2 increases and a gas ejected from the kneading tank 2 entraining the powder compounding agent P flows into the air bag 21, the air bag 21 withstands a pressure accumulation of the inflow gas, and when the internal pressure of the kneading tank 2 decreases, a return flow is generated in the kneading tank 2 by a pressure difference between the internal pressure of the kneading tank 2 and a pressure in the air bag 21 so that the powder compounding agent adhered on an inner surface of a filtering tube 25, which is described later, in the air bag 21 is blown off and collected into the kneading tank 2. This allows the collected powder compounding agent to be mixed into the compound during kneading process and kneaded as a compounding agent.

A configuration of the air bag 21 will be more specifically described. As shown in detail in FIGS. 3 and 4, in the air bag 21, an upper open end of a tubular shaped bag body 21a is air tightly attached around a peripheral edge of a rigid circular top plate 21b so that the upper end of the bag body 21a is sealed while being held in a tubular shape, and a lower end of the bag body 21a is connected to an upper opening tube section 23a of a funnel shaped large diameter portion 23 connected to the upper end of the ventilation chute 22. The lower end of the bag body 21a and a reinforcement piece 26 which is sewed to the lower end of the filtering tube 25 which is disposed inside the bag body 21a are fit onto the upper opening tube section 23a of the funnel shaped large diameter portion 23 of the ventilation chute 22 and are connected by tightening them by using a band 27. Accordingly, the air bag 21 and the filtering tube 25 with a gap interposed therebetween form a double structure.

Although the filtering tube 25 which is suspended inside the air bag may basically have a substantially conical shape with the upper end gathered and the lower end being open, it is desirable that, in order to provide a maximum area of the filtering tube 25 which is suspended in a limited volume of the air bag 21, a pleat section 25a having four or more pleats (in the figure, six pleats) is formed at the upper edge of a tubular shaped filter cloth as shown in FIG. 4(A) and the pleat section 25a is air tightly sewed and sealed by gathering the upper end of the filter cloth to a small diameter, an intermediate portion is formed into a shape similar to a corrugated shape shown in FIG. 4(B) (but not limited thereto), and a lower portion remains in a tubular shape so that the filtering tube 25, when being suspended at the upper center, basically forms a substantially conical shape with the upper end having a small diameter but also forms an irregular conical shape as a whole. In this case, as shown in FIG. 4(B), an envelope surface E which is in contact with the inner bottom of troughs of the pleats which are formed by gathering the upper end of the tubular shaped filter cloth of the filtering tube 25 forms a substantially conical shape.

When the filtering tube 25 is suspended by engaging a hook 25b on the upper end of the filtering tube 25 with a suspension ring 28 at the center on the inner surface of the circular top plate 21b of the air bag 21 and the bag body 21a remains in a tubular shape by pressurization of the inside, the filtering tube 25 generally forms a conical shape with a gap interposed between the entire circumference and the entire length of the filtering tube 25 and the inner surface of the air bag 21. The gap is formed to have a volume for containing the amount of gas sufficient to blow off the powder compounding agent adhered on the inner surface of the filtering tube 25. Further, the filtering tube 25 is formed such that the gap is retained between the entire peripheral surface of the filtering tube 25 and the inner surface of the air bag 21, and a filter surface area of the filtering tube 25 becomes as large as possible in the air bag 21. The above configuration of the filtering tube 25 is effective to significantly improve a recovery rate of the powder compounding agent.

The tubular shaped lower end of the filtering tube 25 is connected to the upper opening tube section 23a of the funnel shaped large diameter portion 23 of the ventilation chute 22. In so doing, in order to effectively prevent leakage of the powder compounding agent, the tubular shaped reinforcement piece 26 is sewed to the lower end of the filtering tube 25, and the lower end of the air bag 21 and the reinforcement piece 26 are fitted onto the upper opening tube section 23a of the funnel shaped large diameter portion 23 of the ventilation chute and are tightened by using the band 27 with the lower end of the filtering tube 25 being hung inside the upper opening tube section 23a of the large diameter portion 23.

Figure 4:
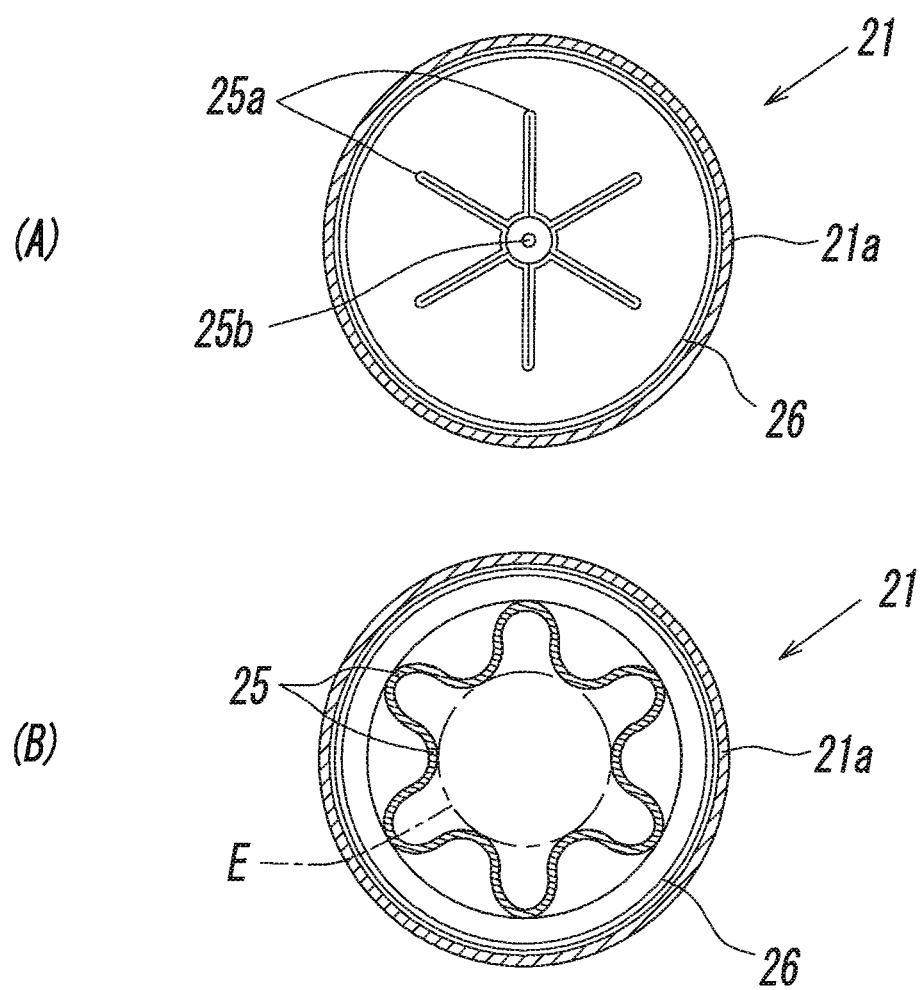
FIG. 4(A) is a sectional view taken along the line a-a of FIG. 3.
FIG. 4(B) is a sectional view taken along the line b-b of FIG. 3.

Accordingly, when a gas containing the powder compounding agent flows from the kneading tank 2 through the ventilation chute 22 into the air bag 21, the powder compounding agent is efficiently filtered out by the entire inner surface of the filtering tube 25 and captured on the inner surface of the filtering tube 25. In this case, the filtering tube 25 with a large filter surface area, which is previously described with reference to FIG. 4, is also advantageous in that the a filtration rate of a pressurization gas for blow off is decreased to improve a capture rate of the powder compounding agent.

When the internal pressure of the kneading tank 2 decreases, the gas in the air bag 21 is returned to the kneading tank 2 and the powder compounding agent which has been filtered out and captured on the entire surface of the filtering tube 25 is blown off at once into the kneading tank 2 by a return flow of the gas. Accordingly, the material flexibility and the volume of the air bag 21 should be decided taking into consideration the flow pressure and flow speed necessary to blow off the powder compounding agent captured by the filtering tube 25 when the internal pressure of the kneading tank 2 decreases by raising the pressurizing cap 6 as described later.

In the powder compounding agent recovery device 20, the filtering tube 25 is suspended inside the air bag 21 as a double structure and configured such that the powder compounding agent P captured by the filtering tube 25 can be returned to the kneading tank 2 by a pressurization gas accumulated in the air bag 21 when the internal pressure of the kneading tank 2 decreases by raising the pressurizing cap 6. However, there are some cases where it is difficult to blow off the powder compounding agent P filtered and adhered on the inner surface of the filtering tube 25 only by the pressurization in the air bag 21 and the amount of gas and the pressure of the pressurization is not sufficient to return the powder compounding agent P into the kneading tank 2. In order to avoid this problem, the air bag 21 includes an additional blow off mechanism for blowing off the powder compounding agent P captured by the filtering tube 25 and is configured to actuate the additional blow off mechanism to blow off the powder compounding agent P captured by the filtering tube 25 to the kneading tank 2, when the amount of gas and the pressure in the air bag 21 is insufficient.

Figure 3:
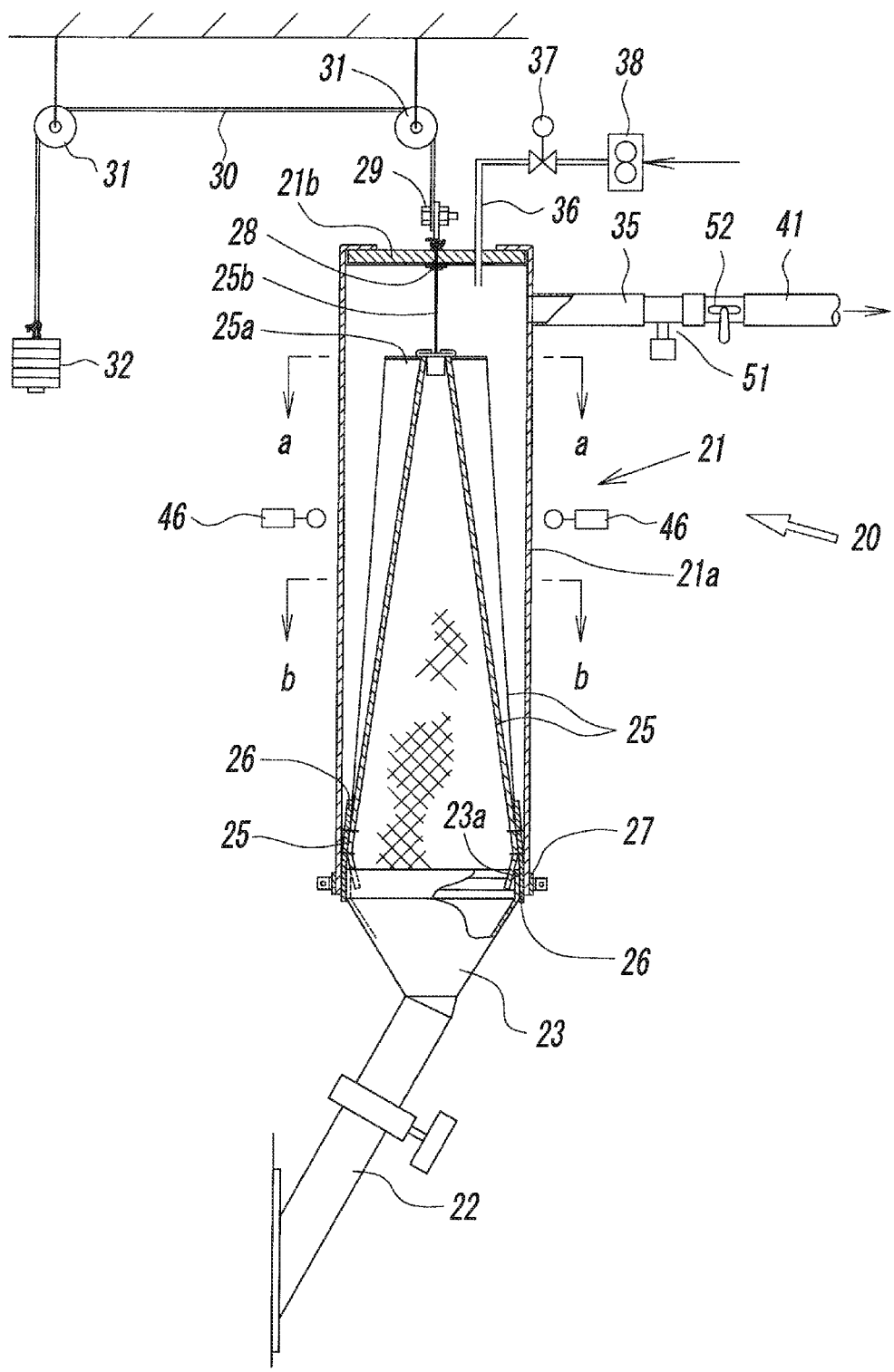
FIG. 3 is a vertical sectional view which shows a configuration of an essential part of the powder compounding agent recovery device.

As the additional blow off mechanism for blowing off the powder compounding agent P, as shown in FIGS. 1 and 3, a single or a plurality of nozzles 36 are disposed on the top plate 21b which holds the top of the air bag 21 so that a gas for blow off is sent into an area in the air bag 21 and outside the filtering tube 25. The nozzle 36 is connected to a gas source 38 via an ventilation control valve 37 that controls the amount of ventilation and is suitably configured to blow off the powder compounding agent P on the filtering tube 25 to the kneading tank 2 by a forced ventilation of a pressurized air or the like with a pressure higher than the internal pressure of the kneading tank 2 and a minimum amount of ventilation. As a result, the blow off mechanism can be reinforced with a relatively small amount of ventilation.

The additional blow off mechanism can be used for a powder compounding agent having high stickiness. Further, the additional blow off mechanism can be also used for a compounding agent which is adhered on the inner surface of the filtering tube 25 due to a volatile constituent generated from a kneading material when it is heated as the kneading proceeds and tends to be relatively difficult to be peeled off in order to support such peel off function.

Although the air bag 21 is basically formed in a tubular shape, the air bag 21 expands and collapses in the longitudinal direction in response to inflation and deflation as shown in FIGS. 5 to 8. The air bag 21 is hung at one end of a wire 30 via a hook 29 which is provided at the center on the top of the circular top plate 21b, and a balancing weight 32 is hung at the other end of the wire 30 with the wire 30 being wound around a plurality of pulleys 31 located above the air bag 21. Accordingly, the air bag 21 is hung from a ceiling or the like to be movable upward and downward, thereby retaining the tubular shape regardless of its inflation and deflation. Moreover, inflation of the air bag 21 due to an increased internal pressure can be detected as necessary by an excessive pressure inflation detector 46 that is disposed around the air bag 21 and detects increase in diameter or a pressure sensor or the like in the air bag 21, and the detected inflation can be used for an open/close operation control of the open/close damper 51, 53 via a controller, which is described later.

Further, a flexible branch duct 35 that communicates with the outside via a dust collecting device 40 is connected to an upper portion of the air bag 21. The branch duct 35 serves as a safety flow path for avoiding damage to the bag body 21a and allows the part of the gas to be exhausted through the branch duct 35 to the external dust collecting device 40 when the amount of gas flowed from the kneading tank 2 into the bag body 21a exceeding an inflatable volume of the bag body 21a is detected by the excessive pressure inflation detector 46 or the like.

Devices for other purposes can be also used as the dust collecting device 40, and a suction duct 41 of those devices can be connected to the branch duct 35. Moreover, although the filtering tube 25 is disposed inside the air bag 21 so that the powder compounding agent does not flow into the air bag 21 through the filtering tube 25, when a rubber or rubber chemicals are loaded through the opened loading door 11, so large amount of dust is scattered from the kneader that a large hood is necessary above the loading port. The dust collecting device 40 can collect the dust through the ventilation chute and effectively prevent scattering of dust.

In addition, reference number 60 in the figures indicates a work table.

The closed pressure type kneader 1 and the powder compounding agent recovery device 20 are automatically or semi-automatically controlled by a controller or the like, which is not shown, and include valves and dampers in each section to be controlled by the controller. Their operations and configurations will be described below in conjunction with a method for recovering the powder compounding agent by the powder compounding agent recovery device 20 with reference to FIGS. 5 to 8.

Although the closed pressure type kneader 1 and the powder compounding agent recovery device 20 can be automatically or semi-automatically controlled by a controller or the like, it is a matter of course that the closed pressure type kneader 1 and the powder compounding agent recovery device 20 can be also controlled by manual or other means rather than automatically or semi-automatically.

Figure 5:
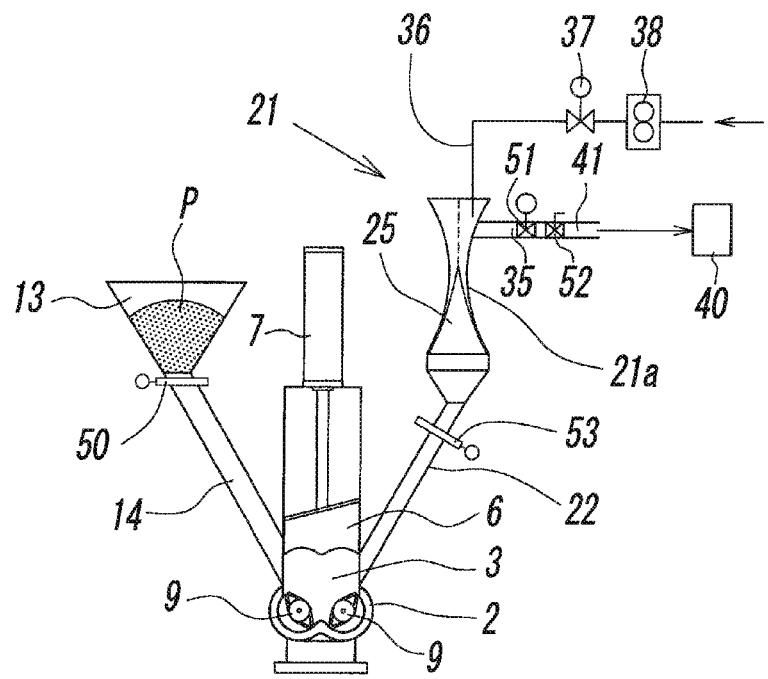
FIG. 5 is a schematic explanatory view which shows the kneader in a state before kneading starts.

First, FIG. 5 shows the closed pressure type kneader 1 in a state before kneading starts. In this state, a loading valve 50 in the powder chute 14 of the compounding agent hopper 13 for supplying the powder compounding agent P is closed, and a necessary amount of the powder compounding agent P which is measured in advance has been loaded in the compounding agent hopper 13. The loading valve 50 is automatically opened and closed by a signal from the controller at a necessary timing.

An open/close damper 51 which is opened and closed by a signal from the controller is disposed in the branch duct 35 which is connected to the upper portion of the air bag 21 and to the suction duct 41 of the dust collecting device 40. Further, an adjusting damper 52 that determines an amount of a suction flow to the dust collecting device 40 is disposed in the branch duct 35, and an open/close damper 53 which is opened and closed by a signal from the controller is disposed in the ventilation chute 22 between the air bag 21 and the raising and lowering path 3 of the kneading tank 2. Those open/close mechanisms are open in the state before kneading starts as shown in FIG. 5.

In this state, the open/close damper 51 is open and the inside of the air bag 21 is connected to the suction duct 41 of the dust collecting device 40 via the branch duct 35. Since the kneading tank 2 which communicates with the ventilation chute 22 does not have other portion which is open to the outside, the air bag 21 is in a collapsed state due to suction by the suction duct 41 with the gas being exhausted from the inside. Although the filtering tube 25 inside the air bag 21 is in a state being collapsed by the air bag 21, the filtering tube 25 returns to the original shape when a gas flows from kneading tank 2 into the filtering tube 25.

In the state of FIG. 5, when a start signal for starting kneading is output from the controller, the loading door 11 (FIG. 2) for loading the kneading material into the kneading tank 2 is opened in response to the start signal and a high viscosity kneading material such as rubber, plastic, ceramics is loaded into the kneading tank 2. The loading door 11 can be manually operated.

After the kneading material is loaded, the loading door 11 is closed while a pair of kneading rotors 9 start to rotate, the pressurizing cap raising and lowering path 3 of the kneading tank 2 is closed by lowering the pressurizing cap 6 by means of the pressurizing mechanism 7, and a mass of kneading material is pressed and kneaded by rotation of the kneading rotors 9. This is the kneading of a first step. In this first step, the powder compounding agent P has not been loaded yet into the kneading tank 2, and the air bag 21 is in a collapsed state (not shown in the figure) with the open/close damper 51 of the branch duct 35 being open and the open/close damper 53 of the ventilation chute 22 being closed.

Figure 6:
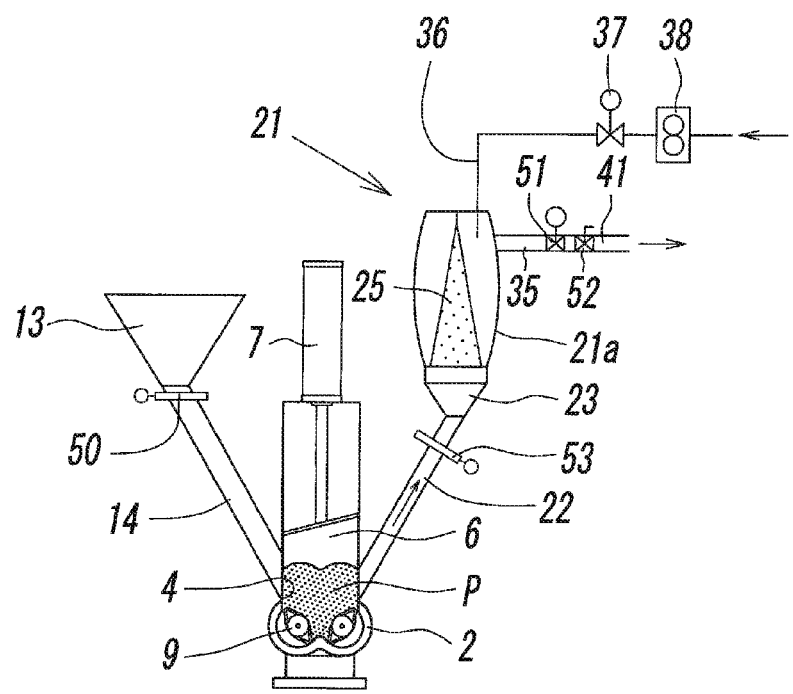
FIG. 6 is a schematic explanatory view which shows the kneader in a state that a powder compounding agent has been loaded.

The kneading of the first step is performed for a predetermined period of time. After the predetermined period of time has elapsed, the pressurizing cap 6 is raised and the loading valve 50 in the powder chute 14 for the compounding agent hopper 13 and the open/close damper 53 in the ventilation chute 22 are simultaneously automatically opened with the loading door 11 and the open/close damper 51 in the branch duct 35 being closed. The powder compounding agent P preloaded in the compounding agent hopper 13 is fed through the powder chute 14 into a space inside the surrounding wall 4 which surrounds the pressurizing cap raising and lowering path 3 of the kneading tank 2 while the pressurizing cap 6 is stationary at the upper limit, and then, the valve 50 is closed after the powder compounding agent P is loaded. As the powder compounding agent P is loaded, a gas of a volume equal to that of the powder compounding agent P is scattered into the air bag 21 through the ventilation chute 22. The gas contains a large amount of powder compounding agent P which is flowed due to the flow of the powder compounding agent P, and this powder compounding agent P flows into the air bag 21 together with the gas, and accordingly, the gas applies pressure to the inside of the air bag 21. As a matter of course, the powder compounding agent P flowed into the air bag 21 is filtered and captured by the filtering tube 25. This state is shown in FIG. 6.

Figure 7:
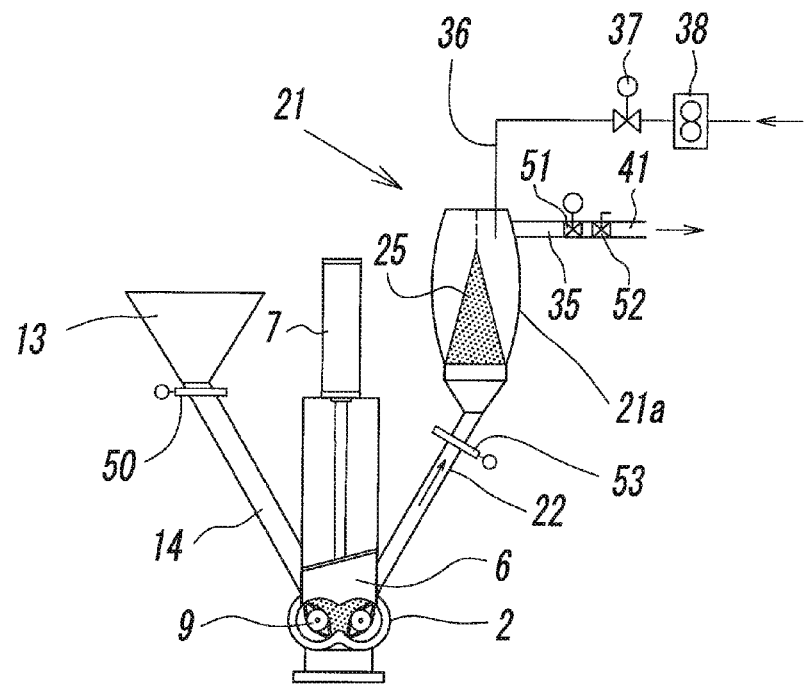
FIG. 7 is a schematic explanatory view which shows that a pressurizing cap is lowered from a state shown in FIG. 6.

Next, the pressurizing cap 6 is lowered by the pressurizing mechanism 7 as shown in FIG. 7, and the kneading of a second step is started. In the kneading of the second step, the high viscosity kneading material loaded in the kneading tank 2 and the powder compounding agent P loaded from the compounding agent hopper 13 are kneaded.

In the kneading of the second step, the pressurizing cap raising and lowering path 3 of the kneading tank 2 is closed by lowering the pressurizing cap 6. As the pressurizing cap 6 is lowered, a gas which corresponds to a lowered amount of the pressurizing cap 6 inside of the surrounding wall 4 of the pressurizing cap raising and lowering path 3 of the kneading tank 2 is compressed and ejected through a gap between the pressurizing cap 6 and the surrounding wall 4 of the pressurizing cap raising and lowering path 3 into a space above the pressurizing cap 6. The gas and the powder compounding agent P entrained by the gas together flow out from the kneading tank 2 through the filtering tube 25 into the bag body 21a of the air bag 21. The air bag 21 is further pressurized by the gas, and the powder compounding agent P entrained by the gas is filtered out and captured by the filtering tube 25 when passing through it.

In the air bag 21 into which the gas flows after the powder compounding agent P is filtered out by the filtering tube 25, the filtering tube 25 in a conical shape is disposed with the upper end having a small diameter and the lower end formed in a tubular shape and connected to the ventilation chute 22 together with the lower end of the air bag 21 such that a gap is formed between the entire peripheral surface of the filtering tube 25 and the inner surface of the air bag 21. When the gas containing the powder compounding agent P flows into the air bag 21, the powder compounding agent is filtered out by the entire surface of the filtering tube 25 when passing through the filtering tube 25 and efficiently captured in the filtering tube 25. Further, at the same time that the powder compounding agent is captured by the filtering tube 25, a kneading operation by the kneading rotor 9 can be continued.

After the gas and the like flows into the air bag 21, the open/close damper 53 disposed in the ventilation chute 22 between the air bag 21 and the kneading tank 2 is closed. At this time, since the open/close damper 51 of the branch duct 35 connected to the suction duct 41 of the dust collecting device 40 is also closed, the filtering tube 25 and the bag body 21a of the air bag 21 are held in an inflated pressurized state by the gas containing the powder compounding agent P which has flowed into the air bag 21.

In this operation step, when the pressure inside the air bag 21 excessively increases for some reason and is detected by the excessive pressure inflation detector 46 or the like or determined by an operator, the open/close damper 51 of the branch duct 35 is opened and a flow volume is adjusted by the adjusting damper 52 as necessary, thereby allowing the air bag 21 to communicate with the suction duct 41 of the dust collecting device 40 via the branch duct 35 and decreasing the internal pressure of the air bag 21. In this case, the powder compounding agent is also captured by the filtering tube 25, and accordingly, is not exhausted into the dust collecting device 40.

Figure 8:
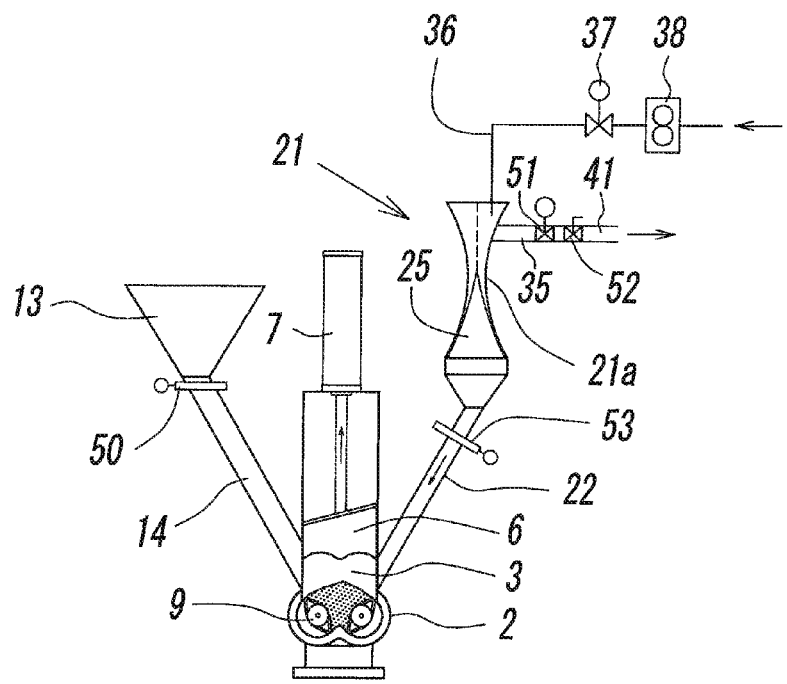
FIG. 8 is a schematic explanatory view which shows that a pressurizing cap is raised from a state shown in FIG. 7.

When the kneading operation of the second step in the kneading tank 2 is completed in the state of FIG. 7, the pressurizing cap 6 is raised for a finishing kneading operation of a third step. At the completion of the kneading operation, a signal to open the open/close damper 53 disposed in the ventilation chute 22 between the air bag 21 and the kneading tank 2 is output at the same time the signal to raise the pressurizing cap 6 at a predetermined timing, and accordingly, the internal pressure of the kneading tank 2 instantaneously becomes negative. Further, even if the open/close damper 51 of the branch duct 35 is open, the open/close damper 51 is closed when synchronized with the start of raising the pressurizing cap 6 by the controller. As a result, as shown in FIG. 8, a gas which has been filled in the air bag 21 in a pressurized state flows into the kneading tank 2 due to a pressure difference between the pressure in the kneading tank 2 and the pressure in the air bag 21, and blows off the powder compounding agent P which has been filtered and captured on the entire inner surface of the filtering tube 25 at once into the kneading tank 2, thereby collapsing the air bag 21.

Then, the open/close damper 51 of the branch duct 35 is opened, the pressurizing cap 6 is gently lowered to a position where it closes the pressurizing cap raising and lowering path 3 of the kneading tank 2, and the finishing kneading operation of the third step is performed to complete a series of the kneading operations. At this time, unlike the starting of the kneading of the second step, the amount of the powder compounding agent P entrained in the gas flow from the pressurizing cap 6, if any, is extremely small since a large amount of the powder compounding agent P is not loaded into the kneading tank. Accordingly, the process returns to the state of FIG. 5.

Also when the powder compounding agent P captured on the entire surface of the filtering tube 25 is blown off into the kneading tank 2 for the finishing kneading operation, since the filtering tube 25 retains a gap between the entire peripheral surface of the filtering tube 25 and the inner surface of the tubular shaped air bag 21 as described above, the powder compounding agent P captured by the filtering tube 25 is highly efficiently returned at once into the kneading tank 2 by a return flow of the accumulated pressurization gas. For the powder compounding agent which is not easily removed from the inner surface of the filtering tube, a blow off gas can be sent from the nozzle 36 into an area in the air bag 21 and outside the filtering tube 25 by operating the ventilation control valve 37 in each time, or alternatively, the ventilation control valve 37 can be controlled in advance to supply a blow off air from the nozzle 36.

Accordingly, since the powder compounding agent P can be blown off in each batch and kneaded into the same batch during kneading process, it is possible to largely contribute for recovery of resource compared with the conventional technique, and it has been found that the powder compounding agent P can be filtered out from a mixed phase flow with a high efficiency of 99% or more especially by selecting an appropriate filtering tube.

When the next batch of the kneading operation is continuously processed after a series of the kneading operations, the loading valve 50 disposed in the powder chute 14 of the compounding agent hopper 13 for supplying the powder compounding agent P is closed in the third step, and the necessary amount of the powder compounding agent P which is measured for the next batch of the kneading operation is loaded into the hopper 13. Moreover, the open/close damper 53 disposed in the ventilation chute 22 between the air bag 21 and the kneading tank 2, and the open/close damper 51 in the branch duct 35 connected to the suction duct 41 of the dust collecting device 40 is opened to be ready for start of the next batch of the kneading operation.

According to a method for recovering the powder compounding agent by the powder compounding agent recovery device 20, a large amount of the powder compounding agent can be prevented from being wasted as dust. By capturing the powder compounding agent using a simple technique and returning it into the kneading tank, the working environment can be significantly improved with a low cost, and at the same time, a valuable recovery rate can be largely increased to bring the compound quality close to the design quality. In a closed type kneader which includes the powder compounding agent recovery device according to the present invention, the capacity of dust collector necessary to be provided per kneader can be significantly reduced to one-half to one-third, thereby achieving a significant reduction in electricity consumption.

The kneading operation of the first to third steps described above is an example of typical kneading operation in the closed type kneader, and as a matter of course, the kneading of the high viscosity kneading material according to the present invention can be modified in design without departing from the spirit of the invention as defined in the appended claims. That is, the above first to third steps are not necessarily performed to complete the kneading, for example, an appropriate kneading process can be adopted depending on the compound formulation of the kneading material.

REFERENCE SIGNS LIST 1 closed pressure type kneader
2 kneading tank
3 pressurizing cap raising and lowering path
4 surrounding wall
6 pressure cap
7 pressurizing mechanism
9 kneading rotor
11 loading door
13 compounding agent hopper
14 powder chute
20 powder compounding agent recovery device
21 air bag
21b top plate
22 ventilation chute 25 filtering tube
35 branch duct
36 nozzle
37 ventilation control valve
50 loading valve
51, 53 open/close damper
52 adjusting damper
P powder compounding agent

The invention claimed is:

1. A powder compounding agent recovery method for a closed pressure type kneader for recovering the powder compounding agent which is ejected from a kneading tank in the closed pressure type kneader, a kneading material being loaded into the kneading tank along with the powder compounding agent loaded from a compounding agent hopper via a powder chute, the kneading material and powder compounding agent being kneaded in the kneading tank by rotation of a pair of kneading rotors with a pressure applied by a pressurizing cap, the method comprising:

providing a powder compounding agent recovery device for recovering the powder compounding agent in which an inflatable and deflatable air bag is connected via a ventilation chute that communicates with a pressurizing cap raising and lowering path of the kneading tank, the air bag being connected to a branch duct which is operable to be opened and closed to atmosphere outside the air bag, and an open/close damper being provided in each of the ventilation chute and the branch duct;

in kneading of the kneading material and the powder compounding agent in the kneading tank, in the state that the open/close damper of the branch duct is open and the open/close damper of the ventilation chute is closed, loading the powder compounding agent onto the kneading material in the kneading tank while a loading valve disposed in the powder chute and the open/close damper disposed in the ventilation chute are simultaneously opened, thereby allowing a filtering tube disposed inside the air bag to filter and capture the powder compounding agent entrained by a gas which flows from the kneading tank to the air bag while applying a pressure by the gas to the inside of the air bag;

allowing the gas ejected from the kneading tank and the powder compounding agent entrained by the gas, as the pressurizing cap is lowered to knead the kneading material and the powder compounding agent, to flow into the air bag and apply a pressure to the inside of the air bag while allowing the filtering tube to capture the powder compounding agent entrained by the gas, and performing a kneading operation by the kneading rotor;

at the end of the kneading operation, allowing the gas which has filled in the air bag in a pressurized state to flow into the kneading tank whose internal pressure instantaneously becomes negative when the pressurizing cap is raised so that a flow of the gas blows off the powder compounding agent, which has been filtered and captured by the filtering tube, into the kneading tank; and lowering the pressurizing cap and performing a finishing kneading operation by kneading the powder compounding agent returned to the kneading tank and completing a series of kneading operations.

2. The powder compounding agent recovery method for a closed pressure type kneader according to claim 1, wherein the filtering tube suspended inside the air bag is sealed at an upper end by gathering the upper end of tubular shaped filter cloth into pleats, and a lower end of the filtering tube formed in a tubular shape is connected along with the lower end of the air bag to an upper end of the ventilation chute, and the filtering tube has a conical shape with a gap being held between the entire peripheral surface of the filtering tube and an inner surface of the air bag when the air bag is held in a tubular shape by an internal pressure.

3. The powder compounding agent recovery method for a closed pressure type kneader according to claim 2, wherein, when the gas, which has filled in the air bag in a pressurized state, flows into the kneading tank due to decrease in the internal pressure of the kneading tank as the pressurizing cap is raised after the kneading operation, an additional blow off mechanism for blowing off the powder compounding agent, which has been captured by the filtering tube, is actuated to blow off the powder compounding agent of the filtering tube.

4. The powder compounding agent recovery method for a closed pressure type kneader according to claim 1, wherein, when the gas, which has filled in the air bag in a pressurized state, flows into the kneading tank due to decrease in the internal pressure of the kneading tank as the pressurizing cap is raised after the kneading operation, an additional blow off mechanism for blowing off the powder compounding agent, which has been captured by the filtering tube, is actuated to blow off the powder compounding agent of the filtering tube.

* * * * *